(12) United States Patent
Hooman et al.

(10) Patent No.: US 7,155,716 B2
(45) Date of Patent: Dec. 26, 2006

(54) WEIGHTED AND PRIORITIZED TASK SCHEDULER

(75) Inventors: Honary Hooman, Newport Beach, CA (US); Dianne L. Steiger, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 09/683,993

(22) Filed: Mar. 8, 2002

(65) Prior Publication Data

US 2003/0172104 A1  Sep. 11, 2003

(51) Int. Cl.
G06F 9/46  (2006.01)
G06F 12/00  (2006.01)

(52) U.S. Cl. ...................... 718/102; 711/100

(58) Field of Classification Search ........ 718/102–103, 718/107; 370/412; 711/100
See application file for complete search history.

(56) References Cited

U.S. PATENT DOCUMENTS

| | | | | |
|---|---|---|---|---|
| 4,642,756 A | * | 2/1987 | Sherrod ...................... | 718/103 |
| 4,942,569 A | * | 7/1990 | Maeno ........................ | 370/230 |
| 5,220,653 A | * | 6/1993 | Miro .......................... | 718/107 |
| 6,058,114 A | | 5/2000 | Sethuram et al. | |
| 6,182,120 B1 | * | 1/2001 | Beaulieu et al. ............ | 709/207 |
| 6,341,303 B1 | * | 1/2002 | Rhee et al. ................. | 718/104 |
| 6,791,990 B1 | * | 9/2004 | Collins et al. .............. | 370/412 |
| 6,816,494 B1 | * | 11/2004 | Raza ..................... | 370/395.41 |

* cited by examiner

*Primary Examiner*—Meng-Ai An
*Assistant Examiner*—Camquy Truong
(74) *Attorney, Agent, or Firm*—Blakely, Sokoloff, Taylor & Zafman LLP (57) ABSTRACT

In one embodiment, a method, system, and apparatus provide prioritized, fair, and weighted task scheduling for a shared execution queue. New tasks are prioritized according to their processing requirements and held in one or more queues according to their priority levels. Tasks are retrieved from each queue in a fair and weighted manner according to the priority level of each queue. In one embodiment, tasks of approximately equal total processing requirements/time are retrieved from each storage queue in a given task retrieval cycle.

16 Claims, 5 Drawing Sheets

WEIGHTED AND PRIORITIZED TASK SCHEDULER

BACKGROUND OF INVENTION

Digital signal processors (DSP) are widely employed to process data streams (frames) and/or tasks. A DSP in a voice gateway often processes data streams with various frame rates (e.g. five milliseconds (ms) to thirty milliseconds) and with a wide range of processing requirements (e.g. different echo canceller tail lengths, different codecs, etc.).

Figure 1:
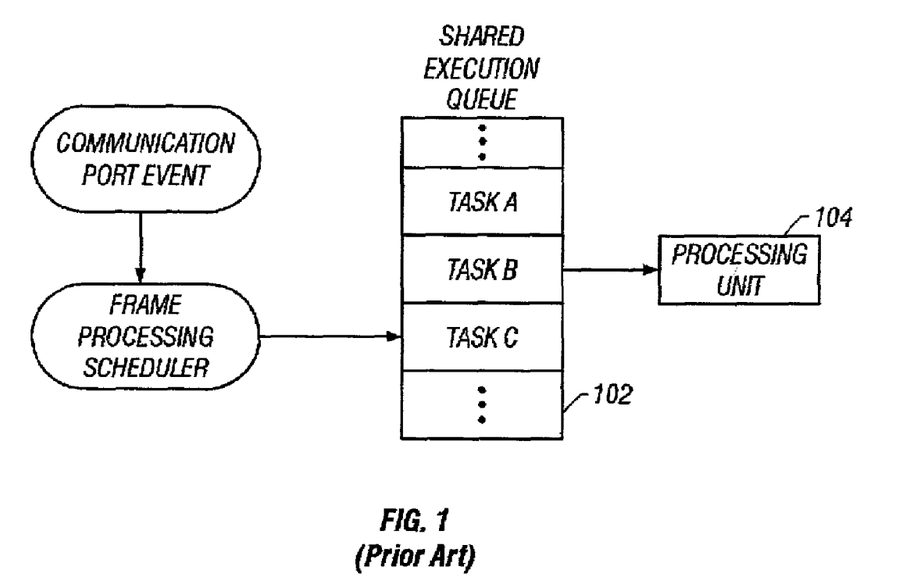
FIG. 1 is a block diagram illustrating one embodiment of a conventional shared execution queue processing tasks.

FIG. 1 illustrates the general approach to processor task scheduling. All the tasks are placed in an execution queue 102 as they are generated. Each processing unit 104 (e.g. a processor), when available to process, checks the execution queue 102 to retrieve any available task and then executes the task. A task may be represented as an identifier corresponding to a data frame(s), data block, or other unit of information to be processed by the processing unit 104.

With this approach, there is no concept of processing priority between queued tasks. Tasks are merely processed in the order in which they are received by the execution queue 102. This type of task execution scheme may cause data flow bottlenecks under certain conditions.

Figure 2:
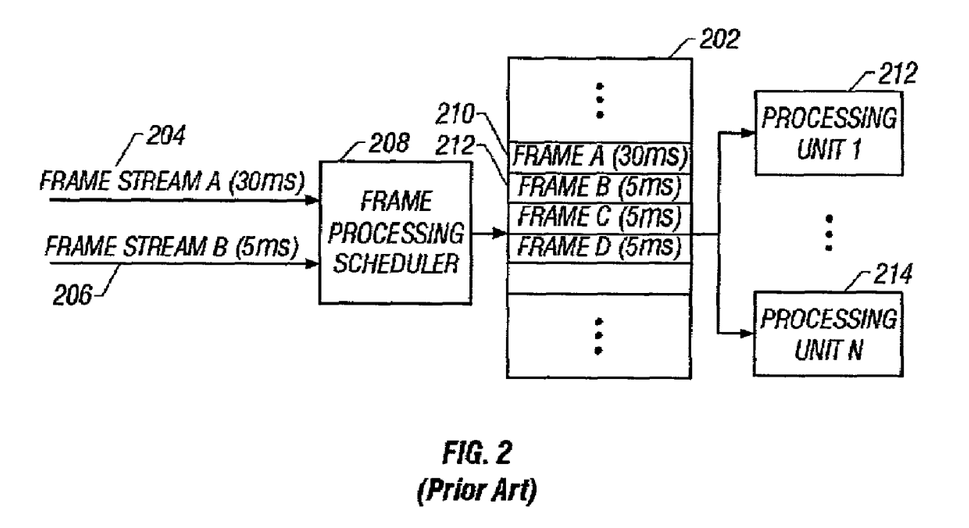
FIG. 2 is a block diagram illustrating possible data flow bottlenecks for one embodiment of a shared execution queue servicing data streams of different frame rates.

For example, FIG. 2 illustrates a shared execution queue 202 receiving two concurrent data streams 204 and 206. A first data stream of thirty-millisecond data frames (thirty milliseconds representing the time in between data frames in the stream) (frame stream A 204) and a second data stream of five-millisecond data frames (frame stream B 206) are queued in the shared execution queue 202, as each data frame arrives, by a frame processing scheduler 208. If the thirty-millisecond data frame A (first to arrive) is processed before the five-millisecond data frame B (second to arrive), this could lead to a bottleneck for the data flow of the five-millisecond frame stream B. For instance, if the thirty-millisecond data frame A takes five milliseconds or more to be processed, then data frame B would not be processed until after data frame C (the next five-millisecond data frame in frame stream B) arrives.

FIG. 2 illustrates a configuration of a shared execution queue 202 that may be accessed by multiple processing units 212 and 214 to process queued tasks.

As more data streams are processed through a single shared execution queue, the likelihood of data flow bottlenecks or congestion increases.

DETAILED DESCRIPTION

In the following detailed description of various embodiments of the invention, numerous specific details are set forth in order to provide a thorough understanding of various aspects of one or more embodiments of the invention. However, one or more embodiments of the invention may be practiced without these specific details. In other instances, well known methods, procedures, and/or components have not been described in detail so as not to unnecessarily obscure aspects of embodiments of the invention.

In the following description, certain terminology is used to describe certain features of one or more embodiments of the invention. For instance, "frame" includes any block or arrangement of data or information. The term "information" is defined as voice, data, address, and/or control. The term "task identifier" includes any representation corresponding to a unique data frame.

One aspect of an embodiment of the invention provides a method, system, and apparatus having multiple execution queues of different priorities coupled to a shared execution queue to provide the shared execution queue with available processing tasks. Another aspect of an embodiment of the invention provides fair and weighted execution of the prioritized processing tasks.

Figure 3:
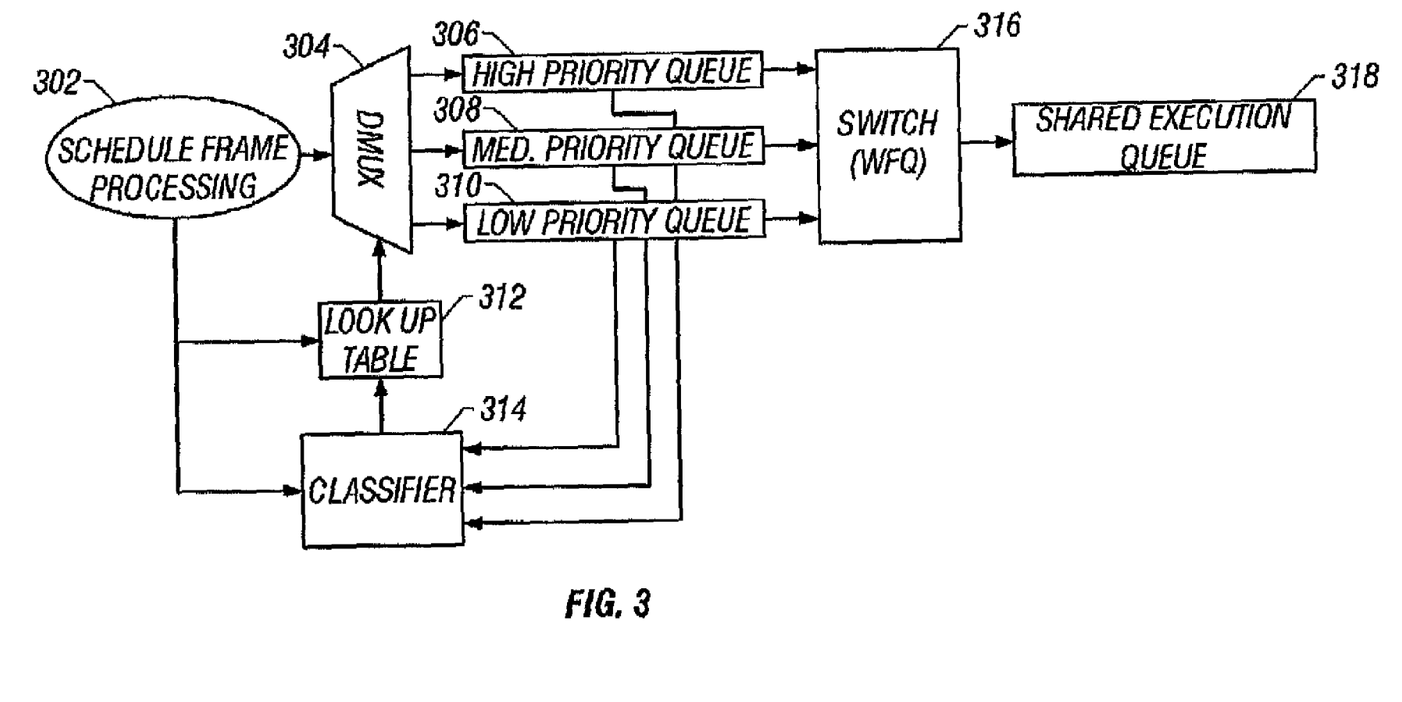
FIG. 3 is a block diagram illustrating a scheduling system with multiple priority queues and a shared execution queue according to one embodiment of the invention.

FIG. 3 is a block diagram illustrating a scheduling system with a shared execution queue according to one embodiment of the invention. Note that the components of the system illustrated in FIG. 3 may be implemented as hardware, software, and/or a combination thereof. As data frames are received, a frame processing scheduler 302 schedules each frame for processing.

In one implementation, each received data frame is assigned a task identifier, any representation corresponding to the unique data frame. Hereinafter, the term "task" is interchangeably employed to refer to a task identifier. The frame processing scheduler 302 may include a task scheduler which schedules new tasks, corresponding to received data frames, for processing.

In one embodiment, a task priority scheduling scheme is employed to permit scheduling each new task according to the processing requirements for the corresponding data stream. One aspect of an embodiment of the invention classifies each task according to their processing priority.

In the implementation shown in FIG. 3, a demultiplexer (task router) 304 is employed to place each new task in one of various queues, each queue corresponding to a different processing priority. For instance, a High Priority Queue 306, a Medium Priority Queue 308, and a Low Priority Queue 310 are illustrated in the embodiment in FIG. 3.

While priority queues are illustrated as separate queues (e.g. 306, 308, and 310), these queues may also be implemented as a single queue segmented into multiple queues of various processing priority levels. In other implementations, a larger or smaller number of queues may be employed, the different queues to hold new tasks of different priority levels. In yet another implementation, each priority queue may hold new tasks in a range of priority levels. That is, a priority queue may hold new tasks of different degrees or levels of priority, but within a particular range of priority levels, with no overlap in priority levels between the different queues. In various implementations, the size of the priority queues (e.g. 306, 308, and 310) may be the same or vary according to the desired implementation. In one embodiment, the size of one or more of the priority queues may be dynamically changed according to the requirements of the implementation.

Task priorities may be assigned in a number of ways. In one embodiment, illustrated in FIG. 3, new tasks are assigned a priority level based on a lookup table 312. That is, each type of session and/or data stream is mapped to a priority queue. Thus, the lookup table 312 enables the demultiplexer 304 to place new tasks, belonging to a particular session or data stream, in the appropriate priority queue. In one implementation, the look-up table 312 is communicatively coupled to the frame scheduler 302 so that as new tasks are sent to the demultiplexer 304 the look-up table 312 provides the corresponding priority level/classification to the demultiplexer 304 to enable it to route the new task to the appropriate priority queue.

Priority classifications may be pre-assigned and/or dynamically assigned based on various factors including frame size, echo canceller tail length (in systems where an echo canceller is employed), codec type, frame processing requirements, etc. According to one implementation, the look-up table 312 is pre-configured with default priority assignments.

Where a dynamic priority assignment is desired, a classifier 314 may be coupled to monitor the queue usage (e.g. the space available in each queue). In the embodiment shown in FIG. 3, a classifier 314 serves to dynamically assign and/or reassign priorities for different session or data stream types. That is, the classifier may modify the priority classification in the look-up table 312 to reassign priorities. Other dynamic priority assignment schemes may be employed without deviating from one or more embodiments of the invention. In one embodiment, the classifier 314 is coupled to the frame processing scheduler 302 to permit the frame processing scheduler 302 to change the priority of frame types in the classifier 314. The classifier 314 also receives feedback from the priority queues 306, 308, and 310 so that it can modify session or data stream priorities as needed. The classifier 314 may serve to provide load balancing by modifying a session or stream priority to avoid overflow in one or more of the queues.

A switch 316 is couple to the priority queues to take new tasks from the priority queues 306, 308, and 310 and place them in a shared execution queue 318. In one implementation, the switch 316 places the new tasks in the shared execution queue 318 in the order in which they are read from the priority queues 306, 308, and 310.

This scheme does not change the interface to processing units (e.g. DSPs) that retrieve tasks from the shared execution queue 318. That is, whenever a processing unit is free it checks the shared execution queue 318 for new tasks to process. If a task is available, then it takes the task and starts processing it. However, one difference between the shared execution queue 318 of this embodiment of the invention and prior art shared execution queues is that, according to one aspect of this embodiment of the invention, tasks are arranged or sorted according to processing priority.

Another aspect of one embodiment of the invention reduces the probability of overflow in the shared execution queue 318. The switch 316 may provide indirect feedback to the rest of the system as to the state of the shared execution queue 318. The switch 316 may delay from or stop removing new tasks from the priority queues 306, 308, and 310, if the shared execution queue 318 starts to get full or is filled beyond a threshold level. Delaying or stopping the transfer of new tasks from the priority queues to the shared execution queue 318 will cause some of the priority queues to start to get full or reach a threshold level. If this is the case, one embodiment of the classifier 314 may dynamically reassign session or data stream priorities to prevent overflow of priority queues. That is, if a particular priority queue starts to get full, session or data stream types may have their priority reassigned to route new tasks to other priority queues (e.g. priority queues with more available space, lower priority queues, etc.).

One aspect of one embodiment of the invention provides fair queuing of new tasks in the shared execution queue.

Figure 4:
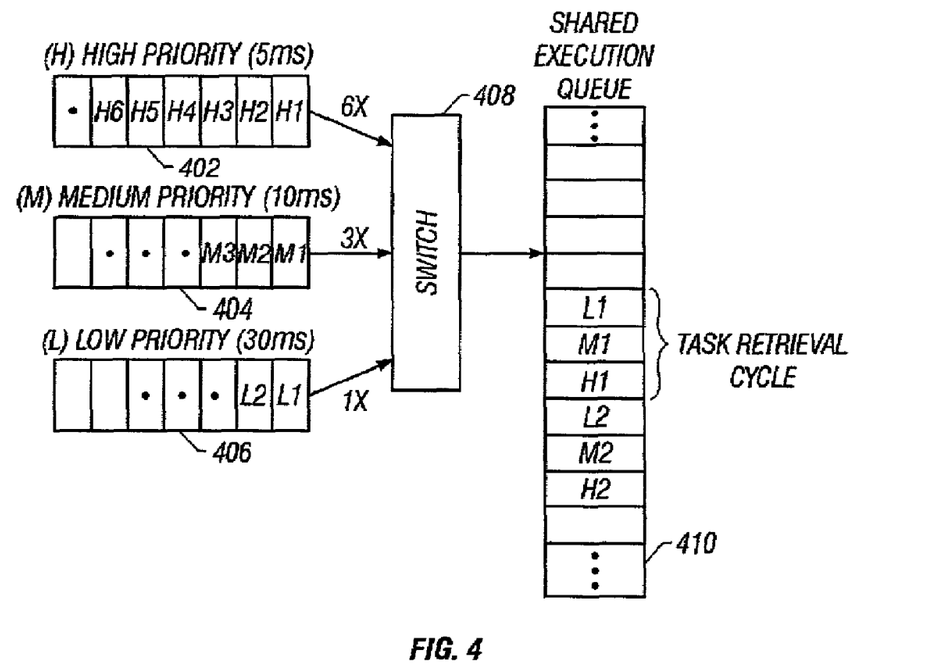
FIG. 4 is a block diagram of various priority queues, a switch, and a shared execution queue illustrating fair queuing of new tasks according to one embodiment of the invention.

FIG. 4 is a block diagram of various priority queues 402, 404, and 406, a switch 408, and a shared execution queue 410 illustrating fair apportionment of new tasks according to one embodiment of the invention. In this illustrative embodiment, three priority queues 402, 404, and 406, are employed to hold new tasks of different priority levels. Priority levels may be assigned according to the processing requirements of each task, session, and/or data stream type. In this example, the High Priority Queue 402 stores new tasks requiring five milliseconds processing times (e.g. the frame should be processed within five milliseconds, before the next frame arrives). Similarly, the Medium Priority Queue 404 holds new tasks requiring ten milliseconds processing times and the Low Priority Queue 406 holds new tasks requiring thirty milliseconds processing times.

To implement fair execution of new tasks held in the priority queues the switch 408 retrieves one task from each priority queue 402, 404, and 406. For example, for every Low Priority Queue task (L1) placed into the shared execution queue 410, one High Priority Queue task (H1) and one Medium Priority Queue task (M1) is placed into the shared execution queue 410.

Another aspect of one embodiment of the invention provides weighted fair queuing in the shared execution queue of new tasks from all priority queues. That is, new tasks in a priority queue should be transferred in a fair and weighted manner relative to the tasks in other priority queues.

Figure 5:
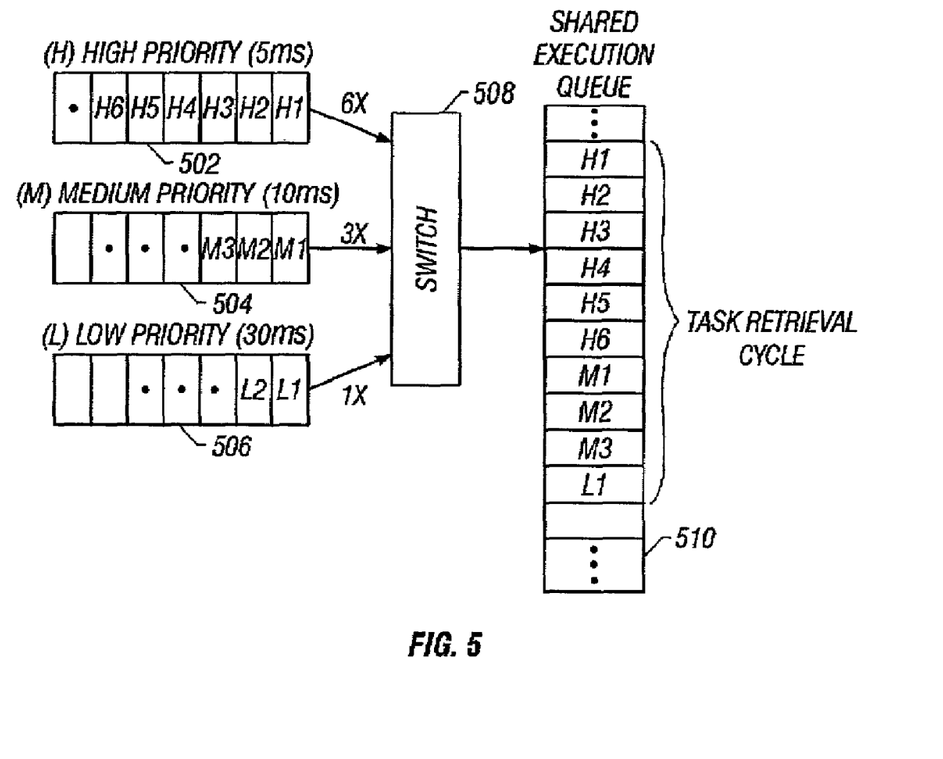
FIG. 5 is a block diagram of various priority queues, a switch, and a shared execution queue illustrating fair and weighted apportionment/queuing of new tasks according to one embodiment of the invention.

FIG. 5 is a block diagram of various priority queues, a switch, and a shared execution queue illustrating fair weighted apportionment of new tasks according to one embodiment of the invention. In this illustrative embodiment, three priority queues 502, 504, and 506, are employed to hold new tasks of different priority levels. As in the example of FIG. 4, priority levels are assigned according to the processing requirements of each task, session, or data stream type. Likewise, the High Priority Queue 502 stores new tasks requiring five milliseconds processing times, the Medium Priority Queue 504 holds new tasks requiring ten milliseconds processing times and the Low Priority Queue holds new task requiring thirty milliseconds processing times.

To implement fair and weighted execution of new tasks held in the priority queues the switch 508 retrieves tasks according to their relative processing requirements. For example, for every Low Priority Queue task (L1)(thirty millisecond task) placed into the shared execution queue 510, six High Priority Queue tasks (H1, H2, H3, H4, H5, and H6)(five millisecond tasks) and three Medium Priority Queue tasks (M1, M2, and M3) (ten millisecond tasks) are placed into the shared execution queue 510.

The number of new tasks retrieved from each priority queue in a given task retrieval cycle is directly related to the processing requirement of the tasks in each queue. For purposes of this description, a task retrieval cycle is defined as the period in which at least one new task is retrieved from every priority queue, assuming that new tasks are available in every priority queue. In the example illustrated in FIG. 5, new tasks are retrieved from each priority queue such that space in the shared execution queue is allotted equally according to processing time restrictions. For instance, in one task retrieval cycle, six new tasks (H1, H2, H3, H4, H5, and H6) from the High Priority Queue 502, each with a five millisecond processing time requirement (for a total of thirty milliseconds) are retrieved, three new tasks (M1, M2, and M3) from the Medium Priority Queue 504, each with a ten millisecond processing time requirement (for a total of thirty milliseconds) are retrieved, and one new tasks (L1) from the Low Priority Queue 506, with a thirty millisecond processing time requirement is retrieved.

The order in which tasks are retrieved from the different priority queues in a given task retrieval cycle may vary without deviating from alternative embodiments of the invention. In the exemplary embodiment illustrated in FIG. 5, the tasks from each priority queue are retrieved together in a given task retrieval cycle. That is, tasks H1, H2, H3, H4, H5, and H6 are retrieved, then tasks M1, M2, and M3 are retrieved, and lastly task L1 is retrieved.

In implementing a fair and weighted scheduling scheme, there are various ways in which the tasks from the various priority queues 502, 504, and 506 may be retrieved, organized, and/or ordered within the shared execution queue for a given task retrieval cycle. Generally, so long as tasks are retrieved from the various priority queues in fair and weighted manner, the order in which the tasks are arranged in the shared execution queue during a given task retrieval cycle does not deviate or vary from one embodiment of the invention.

Figure 6:
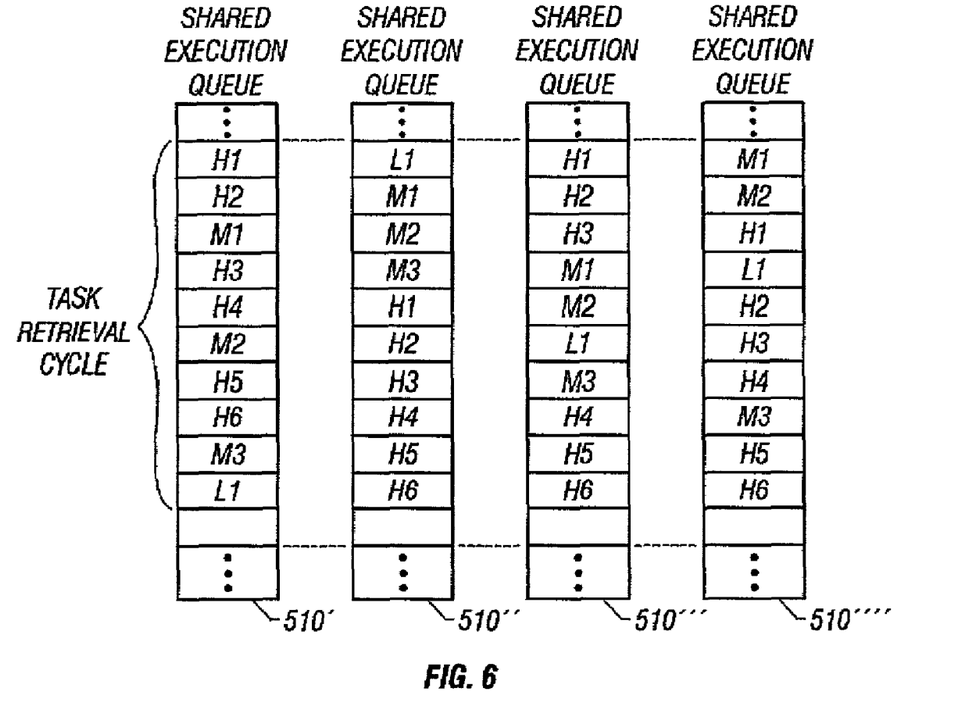
FIG. 6 illustrates various other ways in which new tasks may be queued in a shared execution queue according to a fair and weighted scheduling scheme.

FIG. 6 illustrates various other ways in which new tasks may be queued in a shared execution queue according to a weighted scheduling scheme. In one shared execution queue 510', new tasks from the various priority queues are substantially evenly distributed (e.g. H1, H2, M1, H3, H4, M2, H5, H6, M3, L1) for a given task retrieval cycle. In another shared execution queue 510", new tasks from the various priority queues are retrieved in reverse order of priority (L1, M1, M2, M3, H1, H2, H3, H4, H5, H6) for a given task retrieval cycle. In yet another shared execution queue 510''', new tasks are retrieved in groups of no more than three new tasks from any given priority queue at one time for a given task retrieval cycle.

In yet another implementation of a weighted scheduling scheme, the tasks in a shared execution queue 510"" are retrieved in a random or pseudo-random order (e.g. M1, M2, H1, L1, H2, H3, H4, M3, H5, H6) from the various priority queues for a given task retrieval cycle. While the new tasks may randomly arranged/retrieved during a given retrieval cycle, the weighted scheduling relationship should be maintained during any given retrieval cycle (e.g. six high-priority tasks, three medium-priority tasks, and one low-priority task).

Note that fair and weighted task scheduling of new tasks applies when there are sufficient tasks available in the various queues employed. When in a given task retrieval cycle one or more queues do not have a sufficient number of new tasks to be placed into the shared execution queue in a weighted manner, then various different schemes may be employed during that retrieval cycle. In one implementation, the switch merely retrieves a new task from another priority queue instead, and then continues with the fair and weighted task scheduling as before.

Figure 7:
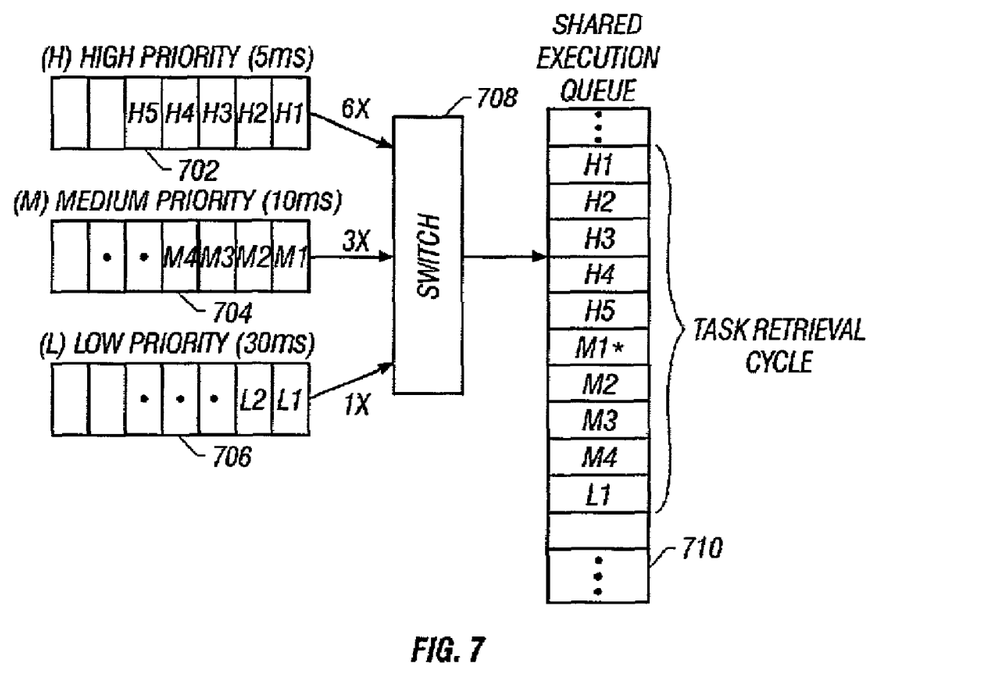
FIGS. 7 and 8 are block diagrams illustrating a couple of ways in which tasks from one priority queue may be used to fill-in for a shortage of tasks from another priority queue in a fair and weighted scheduling scheme.
Figure 8:
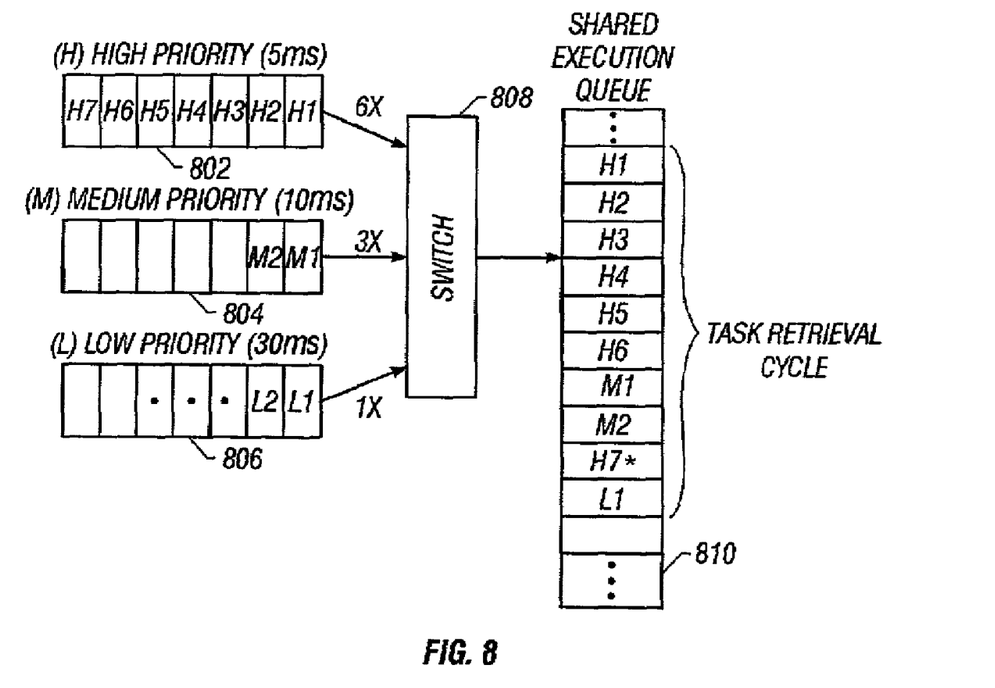

FIGS. 7 and 8 illustrate a couple of ways in which tasks from one priority queue may be used to fill-in for a shortage of tasks from another priority queue. In one embodiment, illustrated in FIG. 7, the switch 708 may retrieve a new task from the next lowest priority queue. For instance, as shown in the shared execution queue 710, when the High Priority Queue 702 does not have any more new tasks, task M1* from the Medium Priority Queue 704 is retrieved by the switch 708 instead. The switch 708 then continues with the fair and weighted task scheduling as before.

In another embodiment, illustrated in FIG. 8, the switch 808 may retrieve the new task from the next highest priority queue. For examples, as shown in the shared execution queue 810, when the Medium Priority Queue 804 does not have any more new task, task H7* from the High Priority Queue 802 is retrieved by the switch 808 instead. The switch 808 then continues with the fair and weighted task scheduling as before.

Figure 9:
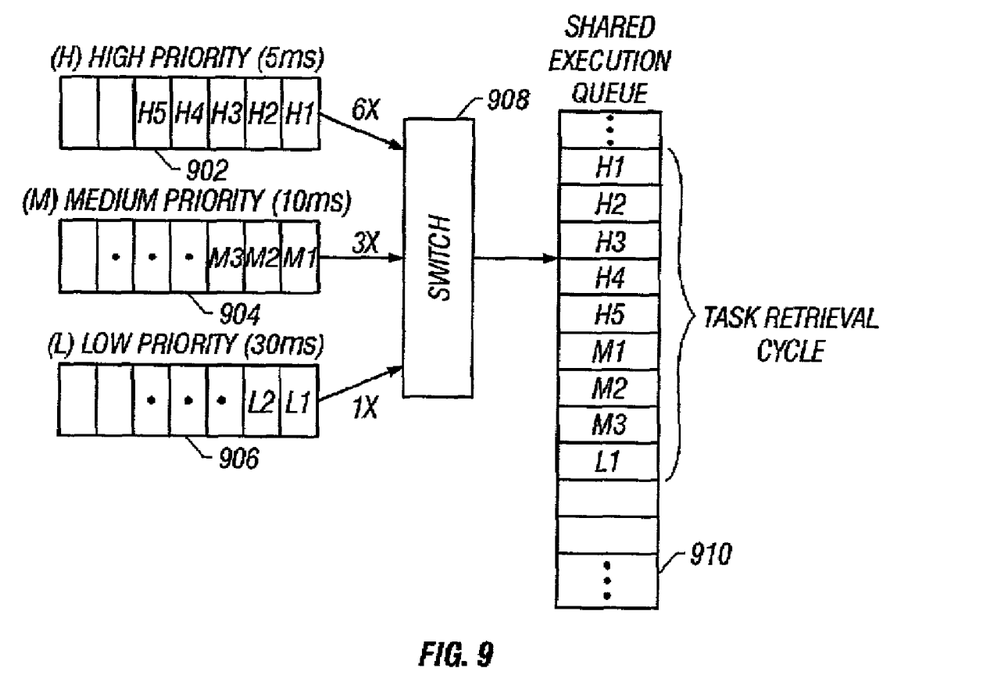
FIG. 9 is a block diagram of illustrating how a priority queue may be skipped in a fair and weighted scheduling scheme when the priority queue does not have any more tasks to be processed.

In another implementation, illustrated in FIG. 9, when a particular priority queue does not have new tasks to be processed, the switch 908 does not retrieve a new task from any other priority queue as a replacement and, instead, just continues its fair and weighted task scheduling by moving to the next priority queue. For example, as shown in the shared execution queue 910, when there are no more high priority tasks (High Priority Queue 902 only has five new tasks instead of six), the switch merely moves on to the next priority queue (Medium Priority Queue 904 in this example) in the weighted scheduling sequence and retrieves M1 after H5. The switch 908 then continues with the fair and weighted task scheduling as before.

While certain exemplary embodiments have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. Additionally, it is possible to implement the embodiments of the invention or some of their features in hardware, programmable devices, firmware, software or a combination thereof.

The invention claimed is:

1. A device comprising:
    a port to receive one or more data streams, each data stream including one or more data frames;
    a task scheduler coupled to the port, the task scheduler to generate a task identifier for every data frame received;
    a first queue to hold task identifiers for which a corresponding data frame is of a first priority type;
    a second queue to hold task identifiers for which the corresponding data frame is of a second priority type, the second priority type different than the first priority type;
    a switch coupled to the first and second queues, the switch configured to retrieve task identifiers from the first queue and the second queue in a fair manner;
    a third queue coupled to the switch, the third queue to hold a plurality of task identifiers placed in the third queue by the switch and provide the task identifiers to a processing unit in the order task identifiers were placed in the third queue by the switch;

a classifier coupled to the port and to the first queue, the classifier to assign one of a plurality of priority types to every data frame received, the plurality of priority types including the first priority type and the second priority type, the classifier to monitor the first queue for an overflow condition and, if an overflow condition is detected, to reassign data frame priority types from the first priority type to the second priority type to prevent overflow of the first queue; and a task router coupled to the task scheduler, the classifier, the first queue, and the second queue, the task router configured to receive the task identifier from the task scheduler, the task identifier corresponding to a received data frame, receive a priority type from the classifier, the priority type corresponding to the received data frame, place the task identifier in the first queue if the priority type is the first priority type, and place the task identifier in the second queue if the priority type is the second priority type.

2. The device of claim 1 further comprising:

a look-up table communicatively coupled to the task scheduler and to the port, the look-up table to provide one of the first priority type and the second priority type to the task scheduler for every data frame received according to the data stream in which the data frame was included.

3. The device of claim 2 wherein one of the first priority type and the second priority type is pre-assigned to the data stream.

4. The device of claim 3 wherein the conversions between priority types and data frame types are dynamically configured in response to usage of the first and second queues.

5. The device of claim 1 wherein the switch is configured to retrieve task identifiers from both the first and second queues in a task retrieval cycle in which at least one task identifier is retrieved from each of the first and second queues such that space in the third queue is allotted equally according to processing time restrictions.

6. The device of claim 1 wherein the switch is configured to retrieve task identifiers with the first priority type until a cumulative processing time requirement for the retrieved task identifiers with the first priority type is substantially equal to a processing time requirement for the task identifiers with the second priority type, and then to retrieve a task identifier with the second priority type.

7. The device of claim 1 wherein the third queue is a shared execution queue from which one or more processing units retrieve task identifiers to process.

8. A method comprising:

receiving one or more data streams, each data stream including one or more data frames of one or more data frame types, each data frame type corresponding to a particular processing time requirement for data frames of the data frame type;

determining a task priority level for each data frame received; routing each data frame to one of one or more storage queues based on the task priority level of each data frame;

retrieving the data frames from the one or more storage queues during a task retrieval cycle according to a fair and weighted processing scheme based on task priority level, wherein data frames of approximately equal total processing time restrictions are retrieved from each storage queue in a task retrieval cycle;

reassigning the task priority level for each data frame received prior to routing if an overflow condition is detected in a first storage queue and if the task priority level would cause a data frame to be stored in the first storage queue, the task priority level being reassigned to a task priority level that will cause the data frame to be stored in other than the first storage queue; and placing a plurality of the retrieved data frames into an execution queue to be processed by a processing unit.

9. The method of claim 8 wherein the task priority level is determined from one of frame size, echo canceller tail length, codec type, and frame processing requirements.

10. The method of claim 8 wherein the task priority level corresponding to a particular data frame type is pre-configured.

11. The method of claim 8 wherein each storage queue stores data frames of a different task priority level than the other storage queues.

12. A method comprising:

receiving one or more data streams, each data stream including one or more data frames of one or more data frame types, each data frame type corresponding to a particular processing time requirement for data frames of the data frame type;

determining a task priority level for each data frame received;

assigning a unique task identifier to each received data frame;

storing each task identifier to one of multiple storage queues according to the task priority level of the corresponding data frame;

retrieving task identifiers from the one or more storage queues during a task retrieval cycle according to a weighted processing scheme based on task priority levels, wherein task identifiers corresponding to data frames of approximately equal total processing time requirements are retrieved from each storage queue in a task retrieval cycle;

reassigning the task priority level for each data frame received prior to storing each task identifier if an overflow condition is detected in a first storage queue and if the task priority level would cause a task identifier to be stored in a first storage queue, the task priority level being reassigned to a task priority level that will cause the task identifier to be stored in other than the first storage queue; and placing a plurality of the retrieved task identifiers into an execution queue to be processed by a processing unit.

13. The method of claim 12 wherein the task priority level is determined from one of frame size, echo canceller tail length, codec type, and frame processing requirements.

14. A machine-readable medium having one or more instructions for scheduling processing tasks, which when executed by a processor, causes the processor to perform operations comprising:

receiving one or more data streams, each data stream including one or more data frames of one or more data types, each data frame type corresponding to a particular processing time requirement for data frames of the data frame type;

determining the task priority level for each data frame received;

routing each data frame to one of one or more storage queues based on the task priority level of each data frame; and retrieving the data frames from the one or more storage queues during a task retrieval cycle according to a fair and weighted processing scheme based on task priority level, wherein data frames of approximately equal total processing time are retrieved from each storage queue in a task retrieval cycle;

reassigning the task priority level for each data frame received prior to routing if an overflow condition is detected in a first storage queue and if the task priority level would cause a data frame to be stored in the first storage queue, the task priority level being reassigned to a task priority level that will cause the data frame to be stored in other than the first storage queue; and placing a plurality of the retrieved data frames into an execution queue to be processed by a processing unit.

15. The machine-readable medium of claim 14 wherein the task priority level is determined from one of frame size, echo canceller tail length, codec type, and frame processing requirements.

16. The machine-readable medium of claim 14 wherein each storage queue stores data frames of a different task priority level than the other storage queues.

* * * * *